US008787672B2

(12) United States Patent
Raichman et al.

(10) Patent No.: US 8,787,672 B2
(45) Date of Patent: Jul. 22, 2014

(54) READER DEVICE HAVING VARIOUS FUNCTIONALITIES

(75) Inventors: Yossef Raichman, Herzlia (IL); Itsick Ben-Tolila, Petach-Tikva (IL); Moshe Cohen, Tel-Aviv (IL)

(73) Assignee: In-Dot Ltd., Tel-Aviv (IL)

( * ) Notice: Subject to any disclaimer, the term of this patent is extended or adjusted under 35 U.S.C. 154(b) by 1287 days.

(21) Appl. No.: 12/530,480

(22) PCT Filed: Mar. 10, 2008

(86) PCT No.: PCT/IL2008/000324
§ 371 (c)(1),
(2), (4) Date: Sep. 9, 2009

(87) PCT Pub. No.: WO2008/111054
PCT Pub. Date: Sep. 18, 2008

(65) Prior Publication Data
US 2010/0104201 A1 Apr. 29, 2010

Related U.S. Application Data

(60) Provisional application No. 60/906,227, filed on Mar. 12, 2007.

(51) Int. Cl.
*G06K 9/00* (2006.01)
(52) U.S. Cl.
CPC .................................... *G06K 9/00* (2013.01)
USPC .......................................... 382/181; 235/470
(58) Field of Classification Search
CPC ............ A63H 2200/00; G06F 3/03542; G06F 17/30725; G06F 17/30876; G06F 17/30879; A63F 2009/2419; A63F 2300/1075; H04N 2201/04724; H04N 2201/3269; H04N 7/181; G06Q 10/107; G11B 27/28; G08B 13/19667; G06K 2017/0045; G06K 19/0723; G06K 7/10435; G06K 7/10772; G06K 1/121; G06K 1/123; G06K 7/1417; H01Q 1/2208; H01Q 7/00; H04L 63/123; B60R 2325/105; B43K 7/005
USPC .................. 382/181; 235/470, 469, 454, 462
See application file for complete search history.

(56) References Cited

U.S. PATENT DOCUMENTS 3,910,701 A 10/1975 Henderson et al.
4,540,176 A 9/1985 Baer
(Continued)

FOREIGN PATENT DOCUMENTS

EP 0094502 11/1983
FR 2885251 11/2006
(Continued)

OTHER PUBLICATIONS

Applicant-Initiated Interview Summary Dated Oct. 9, 2013 From the US Patent and Trademark Office Re. U.S. Appl. No. 12/936,217.
(Continued)

*Primary Examiner* — Vu Le
*Assistant Examiner* — Aklilu Woldemariam
(74) *Attorney, Agent, or Firm* — Roach Brown McCarthy & Gruber, P.C.; Kevin D. McCarthy

(57) ABSTRACT

A reader device for identifying a label associated with a section of a printed publication and presenting first information adjusted for the section. The device comprises a sensing unit for reading a unique machine-readable representation of the first information from the label, a voice recognition unit for intercepting a voice message having a related audio signature associated with second information, a processing unit for identifying the first information according to the representation and the second information according to the related audio signature, and a presentation unit configured for presenting the first and second information.

21 Claims, 6 Drawing Sheets

(56) References Cited

U.S. PATENT DOCUMENTS

| | | | |
|---|---|---|---|
| 4,604,065 A | 8/1986 | Frazer et al. | |
| 4,608,601 A | 8/1986 | Shreck et al. | |
| 4,729,564 A | 3/1988 | Kuna et al. | |
| 4,917,500 A | 4/1990 | Lugos | |
| 5,059,126 A | 10/1991 | Kimball | |
| 5,190,285 A | 3/1993 | Levy et al. | |
| 5,196,683 A | 3/1993 | Marom et al. | |
| 5,260,553 A | 11/1993 | Rockstein et al. | |
| 5,303,037 A | 4/1994 | Taranowski | |
| 5,314,336 A | 5/1994 | Diamond et al. | |
| 5,471,533 A * | 11/1995 | Wang et al. | 380/51 |
| 5,569,902 A | 10/1996 | Wood et al. | |
| 5,574,804 A | 11/1996 | Olschafskie et al. | |
| 5,736,410 A | 4/1998 | Zarling et al. | |
| 5,793,030 A * | 8/1998 | Kelly, Jr. | 235/385 |
| 5,795,213 A | 8/1998 | Goodwin | |
| 5,853,327 A | 12/1998 | Gilboa | |
| 5,912,454 A | 6/1999 | Castillo et al. | |
| 5,945,656 A | 8/1999 | Lemelson et al. | |
| 5,974,235 A * | 10/1999 | Nunally et al. | 709/202 |
| 6,048,209 A | 4/2000 | Bailey | |
| 6,064,421 A | 5/2000 | Pohl | |
| 6,089,943 A | 7/2000 | Lo | |
| 6,091,513 A * | 7/2000 | Ishihara et al. | 358/1.9 |
| 6,249,348 B1 | 6/2001 | Jung et al. | |
| 6,290,565 B1 | 9/2001 | Galyean, III et al. | |
| 6,319,010 B1 | 11/2001 | Kikinis | |
| 6,330,427 B1 | 12/2001 | Tabachnik | |
| 6,354,502 B1 | 3/2002 | Hagstrom et al. | |
| 6,363,390 B1 * | 3/2002 | Shapiro et al. | 1/1 |
| 6,377,249 B1 | 4/2002 | Mumford | |
| 6,392,214 B1 | 5/2002 | Okamoto | |
| 6,510,997 B1 * | 1/2003 | Wilz et al. | 235/472.01 |
| 6,551,165 B2 | 4/2003 | Smirnov | |
| 6,574,425 B1 | 6/2003 | Weiss et al. | |
| 6,773,344 B1 | 8/2004 | Gabai et al. | |
| 6,832,722 B1 * | 12/2004 | Cocola et al. | 235/385 |
| 6,835,131 B1 | 12/2004 | White et al. | |
| 6,905,391 B2 | 6/2005 | Soto et al. | |
| 6,970,070 B2 * | 11/2005 | Juels et al. | 340/10.1 |
| 7,044,429 B1 * | 5/2006 | Foreman et al. | 249/205 |
| 7,062,073 B1 | 6/2006 | Tumey et al. | |
| 7,261,612 B1 | 8/2007 | Hannigan et al. | |
| 7,338,377 B2 | 3/2008 | Shinoda | |
| 7,369,261 B2 * | 5/2008 | Silverbrook et al. | 358/1.15 |
| 7,397,464 B1 | 7/2008 | Robbins et al. | |
| 7,494,062 B2 * | 2/2009 | Holz et al. | 235/435 |
| 7,575,171 B2 * | 8/2009 | Lev | 235/470 |
| 7,635,087 B1 * | 12/2009 | Chung et al. | 235/386 |
| 7,645,178 B1 | 1/2010 | Trotto et al. | |
| 7,883,420 B2 | 2/2011 | Bradbury et al. | |
| 7,980,378 B2 * | 7/2011 | Jones et al. | 194/217 |
| 8,055,899 B2 * | 11/2011 | Levy et al. | 713/176 |
| 2001/0030748 A1 | 10/2001 | Jung et al. | |
| 2002/0008145 A1 | 1/2002 | Walsh et al. | |
| 2002/0022523 A1 | 2/2002 | Dan et al. | |
| 2002/0049833 A1 | 4/2002 | Kikinis | |
| 2002/0097400 A1 | 7/2002 | Jung et al. | |
| 2002/0138493 A1 * | 9/2002 | Shapiro et al. | 707/100 |
| 2002/0152082 A1 * | 10/2002 | Harradine et al. | 704/278 |
| 2003/0003839 A1 * | 1/2003 | Lin | 446/175 |
| 2003/0024975 A1 * | 2/2003 | Rajasekharan | 235/375 |
| 2003/0034399 A1 * | 2/2003 | Wilz et al. | 235/462.45 |
| 2003/0056869 A1 | 3/2003 | Tate et al. | |
| 2003/0173405 A1 * | 9/2003 | Wilz et al. | 235/462.01 |
| 2003/0227628 A1 | 12/2003 | Kreimer et al. | |
| 2004/0195333 A1 * | 10/2004 | Silverbrook et al. | 235/462.11 |
| 2004/0214642 A1 | 10/2004 | Beck | |
| 2004/0223481 A1 * | 11/2004 | Juels et al. | 370/345 |
| 2005/0073722 A1 * | 4/2005 | Silverbrook et al. | 358/1.18 |
| 2005/0082369 A1 | 4/2005 | Benedetti | |
| 2005/0106547 A1 | 5/2005 | Chiu | |
| 2005/0121524 A1 * | 6/2005 | Silverbrook et al. | 235/470 |
| 2005/0125228 A1 | 6/2005 | Samuels | |
| 2005/0146615 A1 * | 7/2005 | Silverbrook et al. | 348/207.2 |
| 2005/0151966 A1 | 7/2005 | Packirisamy et al. | |
| 2005/0278260 A1 * | 12/2005 | Lapstun et al. | 705/71 |
| 2006/0223637 A1 | 10/2006 | Rosenberg | |
| 2006/0274114 A1 * | 12/2006 | Silverbrook et al. | 347/43 |
| 2006/0285172 A1 * | 12/2006 | Hull et al. | 358/448 |
| 2007/0038516 A1 * | 2/2007 | Apple et al. | 705/14 |
| 2007/0108287 A1 | 5/2007 | Davis et al. | |
| 2007/0117602 A1 | 5/2007 | Madigou et al. | |
| 2007/0175998 A1 * | 8/2007 | Lev | 235/454 |
| 2007/0215685 A1 * | 9/2007 | Self et al. | 235/375 |
| 2007/0229859 A1 * | 10/2007 | Lapstun et al. | 358/1.6 |
| 2007/0296552 A1 | 12/2007 | Huang et al. | |
| 2008/0003043 A1 | 1/2008 | Fukui et al. | |
| 2008/0048396 A1 | 2/2008 | Andersen | |
| 2008/0088886 A1 * | 4/2008 | Silverbrook et al. | 358/403 |
| 2008/0285069 A1 * | 11/2008 | Yasuda | 358/1.15 |
| 2009/0005167 A1 | 1/2009 | Arrasvuori et al. | |
| 2009/0197658 A1 | 8/2009 | Polchin | |
| 2009/0272806 A1 * | 11/2009 | Kemp et al. | 235/462.1 |
| 2010/0044441 A1 * | 2/2010 | Cohen et al. | 235/469 |
| 2010/0128296 A1 * | 5/2010 | Denniston et al. | 358/1.13 |
| 2010/0157396 A1 | 6/2010 | Kim et al. | |
| 2010/0219251 A1 | 9/2010 | Decoux et al. | |
| 2011/0027770 A1 * | 2/2011 | Cohen et al. | 434/362 |
| 2011/0310617 A1 | 12/2011 | Cornelissen et al. | |

FOREIGN PATENT DOCUMENTS

| | | |
|---|---|---|
| GB | 2133951 | 8/1984 |
| GB | 2186415 | 8/1987 |
| JP | 2005-034442 | 2/2005 |
| KR | 2001-0093468 | 10/2001 |
| WO | WO 99/46581 | 9/1999 |
| WO | WO 00/15316 | 3/2000 |
| WO | WO 00/79504 | 12/2000 |
| WO | WO 02/07841 | 1/2002 |
| WO | WO 2005/029697 | 3/2005 |
| WO | WO 2006/058204 | 6/2006 |
| WO | WO 2007/124469 | 11/2007 |
| WO | WO 2008/011054 | 1/2008 |
| WO | WO 2008/111054 | 9/2008 |
| WO | WO 2008/111055 | 9/2008 |
| WO | WO 2009/101610 | 8/2009 |
| WO | WO 2009/113067 | 9/2009 |
| WO | WO 2009/125393 | 10/2009 |

OTHER PUBLICATIONS

Notice of Allowance Dated Jul. 23, 2013 From the US Patent and Trademark Office Re. U.S. Appl. No. 12/920,465.
Official Action Dated Apr. 16, 2013 From the US Patent and Trademark Office Re. U.S. Appl. No. 12/920,465.
Official Action Dated Mar. 26, 2013 From the US Patent and Trademark Office Re. U.S. Appl. No. 12/867,259.
Sony "PlayStation® Portable. Instruction Manual PSP-1001 K", Sony®, p. 1-49, Appendix i-iv, 2005.
Applicant-Initiated Interview Summary Dated Jun. 13, 2013 From the US Patent and Trademark Office Re. U.S. Appl. No. 12/920,465.
Notice of Allowance Dated Jun. 10, 2013 From the US Patent and Trademark Office Re. U.S. Appl. No. 12/867,259.
Official Action Dated Jun. 11, 2013 From the US Patent and Trademark Office Re. U.S. Appl. No. 12/936,217.
Communication Relating to the Results of the Partial International Search Dated Apr. 12, 2010 From the International Searching Authority Re.: Application No. PCT/IL2009/000275.
International Preliminary Report on Patentability Dated Oct. 21, 2010 From the International Bureau of WIPO Re. Application No. PCT/IL2009/000378.
International Preliminary Report on Patentability Dated Sep. 23, 2010 From the International Bureau of WIPO Re. Application No. PCT/IL2009/000275.
International Search Report and the Written Opinion Dated Jul. 12, 2010 From the International Searching Authority Re.: Application No. PCT/IL2009/000275.
Written Opinion Dated Jul. 2, 2008 From the International Searching Authority Re.: Application No. PCT/IL2008/000325.

(56) References Cited

OTHER PUBLICATIONS

International Preliminary Report on Patentability Dated Aug. 26, 2010 From the International Bureau of WIPO Re. Application No. PCT/IL2009/000030.
Restriction Official Action Dated Jul. 24, 2012 From the US Patent and Trademark Office Re. U.S. Appl. No. 12/920,465.
Communication Relating to the Results of the Partial International Search Dated May 19, 2009 From the International Searching Authority Re.: Application No. PCT/IL2009/000030.
Communication Relating to the Results of the Partial International Search Dated Sep. 23, 2008 From the International Searching Authority Re.: Application No. PCT/IL2008/000324.
International Preliminary Report on Patentability Dated Jun. 5, 2009 From the International Preliminary Examining Authority Re.: Application No. PCT/IL2008/000325.
International Preliminary Report on Patentability Dated Sep. 24, 2009 From the International Bureau of WIPO Re.: Application No. PCT/IL2008/000324.
International Search Report Dated Jul. 2, 2008 From the International Searching Authority Re.: Application No. PCT/2008/000325.
International Search Report Dated Sep. 2, 2009 From the International Searching Authority Re.: Application No. PCT/IL2009/000030.
International Search Report Dated Jul. 13, 2009 From the International Searching Authority Re.: Application No. PCT/IL2009/000378.
International Search Report Dated Dec. 17, 2008 From the International Searching Authority Re.: Application No. PCT/IL2008/000324.
Written Opinion Dated Sep. 2, 2009 From the International Searching Authority Re.: Application No. PCT/IL2009/000030.
Written Opinion Dated Jul. 13, 2009 From the International Searching Authority Re.: Application No. PCT/IL2009/000378.
Written Opinion Dated Dec. 17, 2008 From the International Searching Authority Re.: Application No. PCT/IL2008/000324.
Official Action Dated Jul. 5, 2012 From the US Patent and Trademark Office Re. U.S. Appl. No. 12/867,259.
Official Action Dated Mar. 21, 2012 From the US Patent and Trademark Office Re. U.S. Appl. No. 12/530,482.
Official Action Dated Dec. 28, 2012 From the US Patent and Trademark Office Re. U.S. Appl. No. 12/936,217.
Official Action Dated Oct. 19, 2012 From the US Patent and Trademark Office Re. U.S. Appl. No. 12/920,465.
Official Action Dated Oct. 24, 2011 From the US Patent and Trademark Office Re. U.S. Appl. No. 12/530,482.
Communication Relating to the Results of the Partial International Search Dated Apr. 12, 2010 From the Interantional Searching Authority Re.: Application No. PCT/IL2009/000275.
International Search Report and the Written Opinion Dated Jul. 12, 2010 From the Interantional Searching Authority Re.: Application No. PCT/IL2009/000275.

* cited by examiner

READER DEVICE HAVING VARIOUS FUNCTIONALITIES

RELATED APPLICATIONS

This Application is a National Phase of PCT Patent Application No. PCT/IL2008/000324 having International filing date of Mar. 10, 2008, which claims the benefit of U.S. Provisional Patent Application No. 60/906,227 filed on Mar. 12, 2007. The contents of the above Applications are all incorporated herein by reference.

FIELD AND BACKGROUND OF THE INVENTION

The present invention relates to a system, apparatus, and a method for adding an interactive layer to printed publications and, more particularly, but not exclusively to system, apparatus, and a method for identifying a label in a printed publication, such as a book, and presenting multimedia content in response.

Devices that add an interactive layer to printed publications, such as books and comic magazines, are known. Coded labels, which are adhered to the printed publication, allow users to gain added enjoyment by playing phrases spoken by popular characters, sound effects, or game ideas, which are related to a section of the printed publication.

An example for such a device is a reader that allows users to scan barcodes, which are printed in the proximity of a certain text, and play a related audio file in response. Such a device has a limited applicability, as it may be difficult to teach little children to perform the scanning along the barcodes. In addition, such a reader uses a laser based reading head that may be hazardous for little children and youngsters, because it may cause undesired eye exposure to the emitted laser. Such an exposure may cause retinal damage if it lasts for more then several seconds.

An example of a device that has better applicability is disclosed in U.S. Patent Application No. 2006/0259314, published on Nov. 16, 2006 that describes a reading device having a handle or grabbing surface, a label identification head and means for outputting an audio sequence corresponding to each label that is identified. The label has bi-dimensional distinguishing features. The identification head includes a bi-dimensional sensor array that is adapted to read the distinguishing features in the label without scanning, when the device is placed over the label. A reading device comprises a handle for easy and ergonomic grabbing by a child's hand, an identification head located in the lower part of the device, for identifying each label when the identification head is placed over the label without scanning and audio generating means for generating predefined sounds for each identified label. As such a reader device is not limited to a laser based reading head, but it may have a greater applicability.

Another example of a device that provides an interactive layer to a book is disclosed in U.S. Pat. No. 6,763,995, issued on Jul. 20, 2004 which describes a method and system for illustrating sound and text comprising a book with pages including illustrations and text, wherein at least some of the pages include magnetic signatures. The system further includes a book holder adapted to accept the book. As such, the book holder has a reading surface with a magnetic signature sensor, a cartridge slot, a reading controller, a speaker, and a power supply. The system also comprises a cartridge adapted to be inserted into the cartridge slot. The cartridge includes stored audio representations related to the illustrations and/or text of the pages. The magnetic signature sensor is predisposed to detect the magnetic signatures on the pages as they are turned by a user viewing the book. Furthermore, the reading controller is adapted to interact with the magnetic signature sensor to determine what page or pages the user is viewing and to retrieve the audio representations of the illustrations and/or text stored on the cartridge corresponding to the page or pages being viewed by the user. Thus, the reading controller reproduces the audible sounds related to the retrieved audio representations through the speaker for listening by the user. Though the patent provides a system for illustrating sound and text, it utilizes a book holder that increases the price of the system and makes it much more complicated for production than a simple system that only comprises a reader device. Moreover, the patent provides a system that is designated to read magnetic signatures from one or more designated books and therefore regular books without magnetic signatures cannot be used.

SUMMARY OF THE INVENTION

According to one aspect of the present invention there is provided a reader device for identifying a label associated with a section of a printed publication and presenting first information adjusted for the section. The device comprises a sensing unit configured for reading a unique machine-readable representation of the first information from the label, a voice recognition unit configured for intercepting a voice message having a related audio signature associated with second information, a processing unit configured for identifying the first information according to the representation and the second information according to the related audio signature, and a presentation unit configured for presenting the first and second information.

Preferably, the processing unit is connected to a repository having a plurality of multimedia content records, the first information being determined by matching the representation with the content records.

Preferably, the processing unit is connected to a repository having a plurality of content records, the second information being determined by matching the audio signature with the content records.

Preferably, the presentation unit comprises a speaker, the presenting being performed by playing the first and second information using the speaker.

Preferably, the first information comprises a question, the voice message being a possible answer to the question.

Preferably, the first information comprises a message, the voice message being instructions to the processing unit, the processing unit configured for identifying the instructions according to the related audio signature.

More preferably, the second information is an authentication message for the possible answer.

Preferably, the first information is represented in a member of the following group: an audio file, a multimedia file, a video file, a text file, and one or more instructions.

Preferably, the presenting comprises a member of the following group: displaying a video sequence, playing an audio sequence, and activating a vibrating element.

More preferably, each the content record comprises a respective identifier, the determining being performed by matching the representation with the respective identifiers, thereby determining one of the plurality of content records.

More preferably, each the content record comprises a respective identifier, the determining being performed by matching the audio signature with the respective identifiers, thereby determining one of the plurality of content records.

More preferably, the reader device further comprises a recording unit configured for recording a new content record, the new content record being stored as one of the plurality of content records.

Preferably, the sensing unit is configured for reading a new respective identifier for the new content record, the new respective identifier being stored in association with the new content record.

Preferably, the reader device further comprises a communication interface for communicating with an additional reader device.

Preferably, the label is presented on a screen display.

Preferably, the label is a sticker.

Preferably, the information comprises a member of the following group: a translation of the section, an answer that matches a question in the section, a description of the section, a description of the label, a description of the color of the section, a description of the color of the label, and an outcome of an exercise in the section.

Preferably, the voice recognition unit is configured for identifying a user according to a voiceprint in the voice message, the processing unit configured for identifying the second information according to the related audio signature and the user.

According to another aspect of the present invention there is provided a reader device for identifying a label having a first machine-readable representation of first information, the label being associated with a section of a printed publication, the first information being adjusted for the section. The reader device comprises a sensing unit configured for reading the representation, a communication interface for communicating with a computing unit, the communication being used for receiving a control signal having a second machine-readable representation of second information from the computing unit, a processing unit configured for identifying first and second information respectively according to the first and second machine-readable representations, and a presentation unit configured for presenting the first and second information.

Preferably, wherein the computing unit is an additional reader device.

Preferably, wherein the communication being used for transmitting a control signal to the computing unit.

More preferably, the control signal is used for configuring the reader device.

Preferably, wherein the communication interface is a member of the following group: a short-range radio communication interface, an Infrared communication interface, sonic communication interface, a Bluetooth® communication interface, an Ultrasonic communication interface.

More preferably, the short-range radio communication interface is based on a member of the following group: a Wi-Fi protocol, a Wi-Max protocol, and an industrial, scientific, and medical (ISM) bands protocol.

According to another aspect of the present invention there is provided a reader device for identifying a label associated with a section of a printed publication and presenting first information adjusted for the section. The reader device comprises a sensing unit comprising a light source unit configured for emitting a light beam toward the label, the label comprising photoluminescent components, the light beam causing a photoluminescent excitation of the photoluminescent components, and a photoelectric sensor configured for intercepting at least a portion of the emission of the photoluminescent excitation and thereby reading a unique machine-readable representation of the first information from the label, a processing unit configured for identifying the information according to the representation, and a presentation unit configured for presenting the information.

Preferably, the label is imperceptible when the photoluminescent excitation decreases below a related excitation threshold.

According to another aspect of the present invention there is provided a system for allowing a user to interactively read a book. The system comprises a plurality of labels configured to be associated with sections of the book, each the label having a respective unique machine-readable representation of first and second information, a first reader device configured for reading the respective representation of each the label and presenting the first respective information in response, and a second reader device configured for reading the respective representation of each the label and presenting the second respective information in response.

Preferably, the first and second reader devices are respectively configured for reading a first group and a second group of the labels, the respective representation of members of the first group being adjusted for the first reader device, the respective representation of members of the second group being adjusted for the second reader device.

Preferably, the first and second respective information are different.

Preferably, the presenting comprises a member of the following group: displaying a video sequence, playing an audio sequence, and activating a vibrating element.

According to another aspect of the present invention there is provided a reader device for use with a label having a unique machine-readable representation of information, the label being associated with a section of a printed publication, the information being adjusted for the section. The reader device comprises a sensing unit configured for reading the representation using a sensor, a processing unit configured for determining the information according to the representation, and a presentation unit configured for presenting the information. The sensor is usable for at least one member of the group consisting of: receiving configuration instructions for the reader device, communicating with an additional reader device, and choosing a working mode of the reader device.

Preferably, wherein the member is choosing a working mode of the reader device, the sensor is an image sensor for intercepting light, the image sensor choosing the working mode according to the intensity of the light.

Preferably, further comprising a repository for storing a plurality of content records storing different information, each the content record have a respective identifier, the determining being performed by matching the representation with the respective identifiers, thereby determining which one of the plurality of content records is the first information.

More preferably, the sensor is used for updating the repository.

Preferably, wherein the member is communicating with an additional reader device, the sensor comprises an image sensor for intercepting light, the image sensor being configured for receiving light flickering, the processing unit configured for determining the information according to the light flickering.

Preferably, wherein the sensor further comprises a light emitting element for transmitting light flickering, the flickering represents instruction for the additional reader device.

According to another aspect of the present invention there is provided a method for identifying and presenting information using a label, the label having a unique machine-readable representation of first information, the label being associated with a section of a printed publication, the first information being adjusted for the section. The method comprises the following step: a) reading the representation, b) identifying and presenting the first information according to the representation, c) acquiring a voice message having a unique audio signature from a user, the unique audio signature representing second information, d) identifying the second information according to the unique audio signature, and e) presenting the second information.

According to another aspect of the present invention there is provided a system for identifying and presenting information using a label. The label having a unique machine-readable representation of information, the label being associated with a section of a printed publication, the information being adjusted for the section. The system comprises a reader device having a sensing unit configured for reading the representation, a first communication interface for transmitting the representation and receiving the information, and a presentation unit configured for presenting the information. The system further comprises a computing unit having a second communication interface for receiving the representation from the reader device and a processing unit configured for determining the information according to the representation, the second communication interface being configured for transmitting the information to the reader device.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
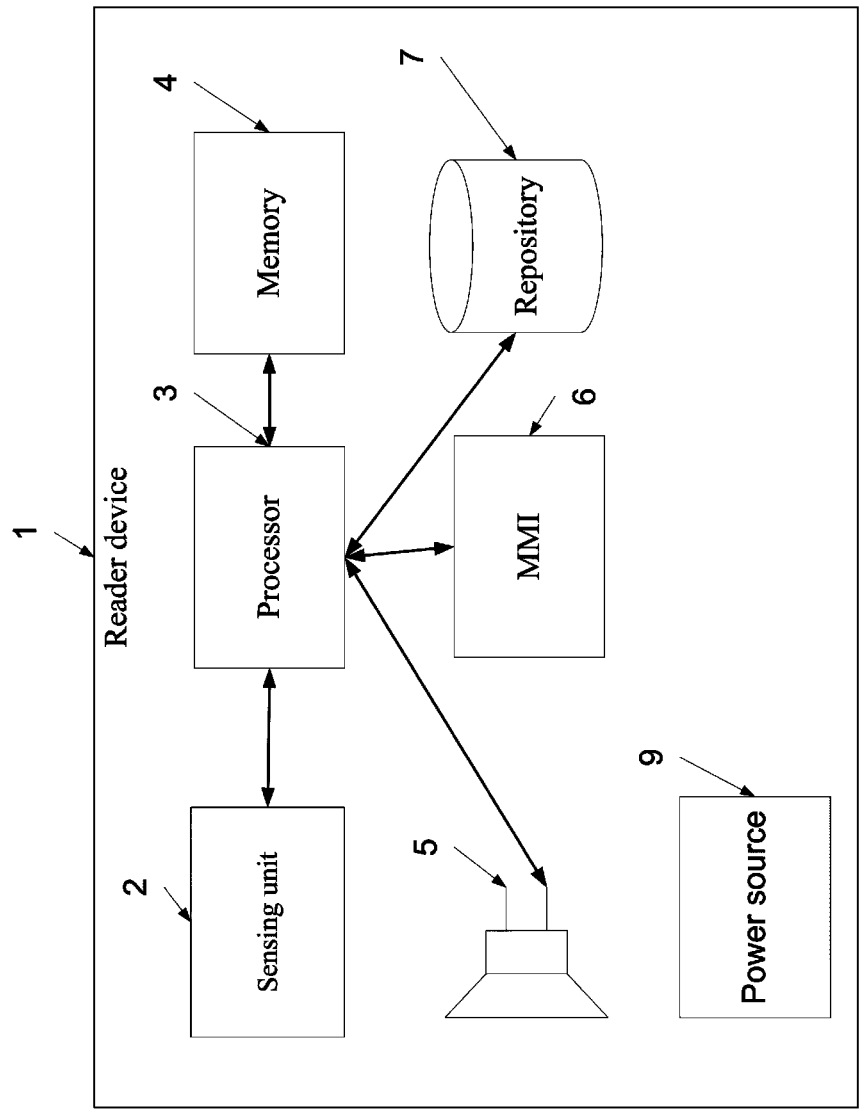
FIG. 1 is a block diagram of a known reader device for identifying labels.

The present embodiments comprise an apparatus and a method for adding an interactive layer to a printed publication by identifying labels having unique machine-readable representations of specific content, such as predefined color labels, and user messages, such as voice messages, and reacting thereto. Each label is associated with a section of the printed publication, such as a paragraph or a question. The reader device reacts to each label or user message by presenting specific multimedia content that provides the user with information that is related to the associated section. In one embodiment of the present invention, a label is associated with a question and the message is a user's answer thereto. In such a manner, the reader device provides the user a learning tool that provides interactive question-answer sessions.

The reader device may be used for reading a label, presenting a matching content record that comprises a question to the user of the reader device, receiving an answer to the presented question, and presenting a response to the receive answer.

In another embodiment of the present invention, a reader device for presenting content according to an identified label that integrates a communication interface is disclosed. The reader device identifies labels having a machine-readable representation of specific content and presents the specific content in response. The reader device uses the communication interface for communicating with a computing unit, such as a personal computer or another reader device. The communication allows the reader device to receive control signals, content, updates, and information from the computing unit, to simulate interactions between two or more virtual figures, or to configure properties of the reader device.

In another embodiment of the present invention, a reader device for presenting content as a response to the identification of a photoluminescent label is disclosed. Such a reader device comprises a sensing unit with a light source unit for emitting light toward the photoluminescent label that causes an excitation of photoluminescent components in the label, and a photoelectric sensor for intercepting at least a portion of the photoluminescent emission from the components. The reader device measures the emission and presents accordingly a matching content, as further described below.

In another embodiment of the present invention, a system for allowing a user to read interactively a printed publication using two or more reader devices is disclosed. The system comprises two different sets of labels, which are associated with sections of the book, and two different reader devices. Each one of the two different sets is adjusted to be read by a different reader device. In one embodiment, different reader devices present different content in response to the reading of the same label.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

A content or information may be understood as an audio sequence, a video sequence, an audio file, a video file, a segment of text, a multimedia content, a word, a number, a paragraph, a link, a pointer, a set of instructions, etc.

A label may be understood to include a color label, a monochrome label, a mark, a spot, a label having a unique color combination, a label having a unique shades of gray color combination, or any label which is used for associating an object, a document, an image, a file, or a page with designated content. The labels may be created on any type of printable media, such as paper, preferably using standard ink and a standard printing process. The labels may be of any shape or color of preferably a diameter as little as 0.33 inches. During the printing process or at any other time, the labels may be encoded with a unique code.

A printed publication may be understood as a book, a comic magazine, a crossword-puzzle, a crossword-puzzles' book, a notebook, a board game, playing cards or tools, a toy, a pamphlet, a brochure, or any document having a number of adhered labels or a tool for displaying visual content.

A section of a printed publication may be understood as a page, a paragraph, a sentence, a word, an image, a query, an answer, etc.

A sensing unit may be understood as a unit that comprises a photoelectric sensor, an image sensor, a color sensor, or any other sensor that is designed for reading labels with unique patterns.

Reference is now made to FIG. 1, which is a block diagram of a known reader device 1 for identifying labels which are associated with sections of a printed publication, and presenting matching information in response. The identification is based on a unique machine-readable representation that is encoded into the label.

The reader device 1 incorporates a processor 3, a reading head 2 that comprises a sensor, such as a photoelectric sensor, a color sensor, an image sensor, and an Infrared (IR) sensor, a memory 4 that stores designated programming, such as a memory chip of application-appropriate capacity, and a presentation unit 5, such as a speaker, for presenting a content that is associated with the identified label and stored in a repository 7. The reader device 1 preferably comprises a man-machine interface (MMI) unit 6, such as a scroll button for controlling the degree of loudness of the speakers and an on/off switch. The repository 7 is designed for storing a number of content records, such as audio or video files, each associated with a signature that matches a representation of a certain label. The reader device 1 further comprises a power source, such as an integral battery housing 9 for supplying power. Preferably, the reader device 1 further comprises an electric socket for supplying external power. Preferably, the electric socket is used to charge batteries, which are positioned in the integral battery housing 9.

Such a reader device 1 allows a user to read a designated book interactively. The designated book comprises a number of labels, which are associated with sections thereof. Each one of the labels is adhered in association with a certain section of the book. In use, the user directs the reading head 2 of the reader device toward a label that he or she desires to read. The sensor of reading head 2 acquires one or more unique properties of the label and forwards them to the processor 3. In one known embodiment, the sensor comprises electro-optical array and a light source. The light source illuminates the label and the electro-optical array intercepts the reflections of the light emitted therefrom. The intercepted reflection is converted to an electric signal that is forwarded to the processor 3. The processor 3 matches the electric signal with content records from the repository 7 and identifies a matching content record. The matching content record is played using the speaker 5. In such a manner, the reading device 1 adds an audio layer to the book, allowing the user to use it for playing audio files, which are related to sections of the book. A detailed description of such a reader device is provided in U.S. Patent Application No. 2006/0259314, published on Nov. 16, 2006, which is herein incorporated by reference.

Figure 2:
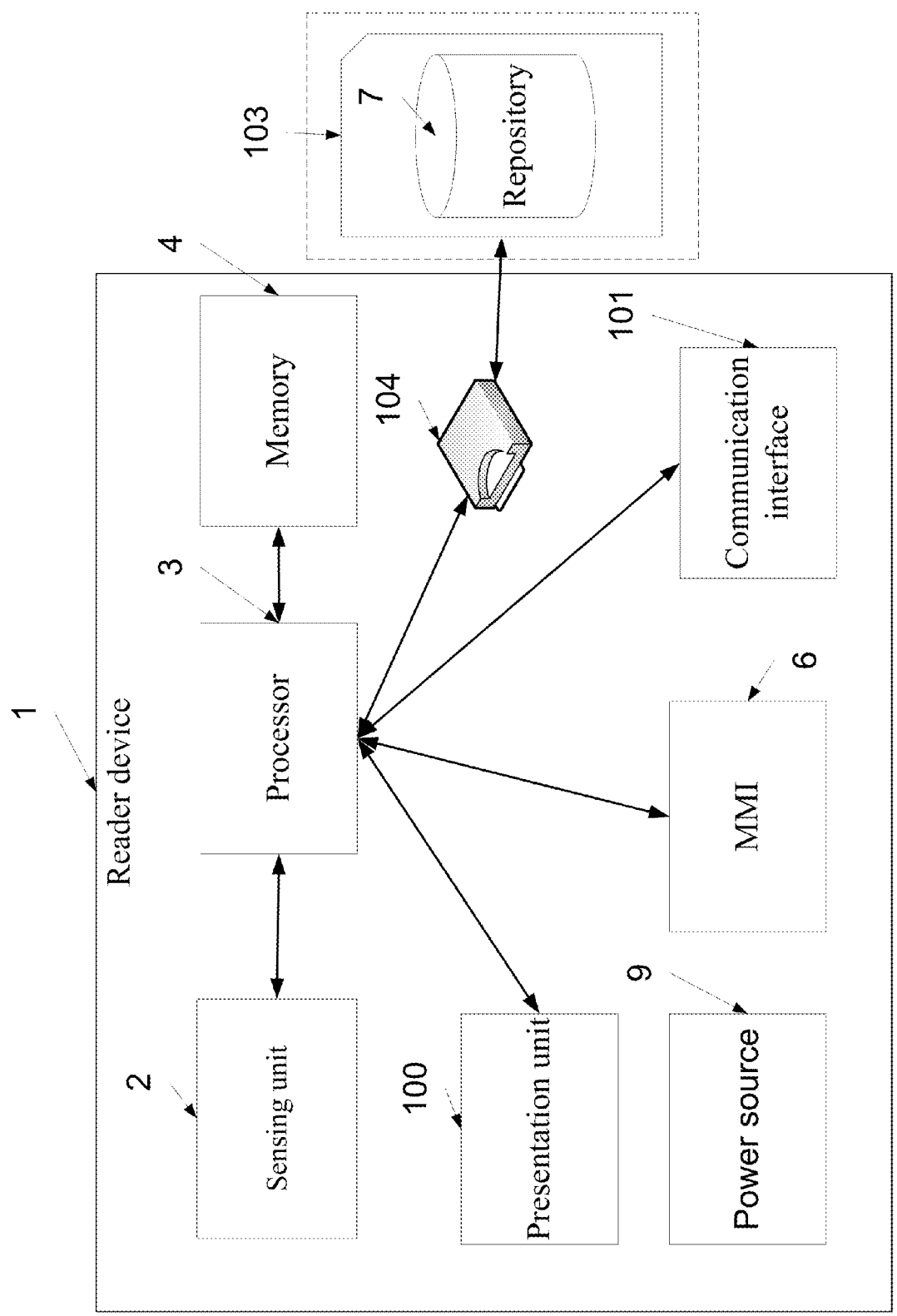
FIG. 2 is a block diagram of a reader device for identifying labels with a communication interface and a presentation unit, according to one embodiment of the present invention.

Reference is now made to FIG. 2, which is a block diagram of a reader device 1 for identifying labels, according to one embodiment of the present invention. The reading head 2, the processor 3, the memory 4, the MMI unit 6, and the integral battery housing 9 are as in FIG. 1. However, FIG. 2 comprises a presentation unit 100 instead of the speaker, a communication interface 101, such as a wired or wireless connection, and a card reader 102 for reading a memory card 103 that contains the repository 7.

Figure 6:
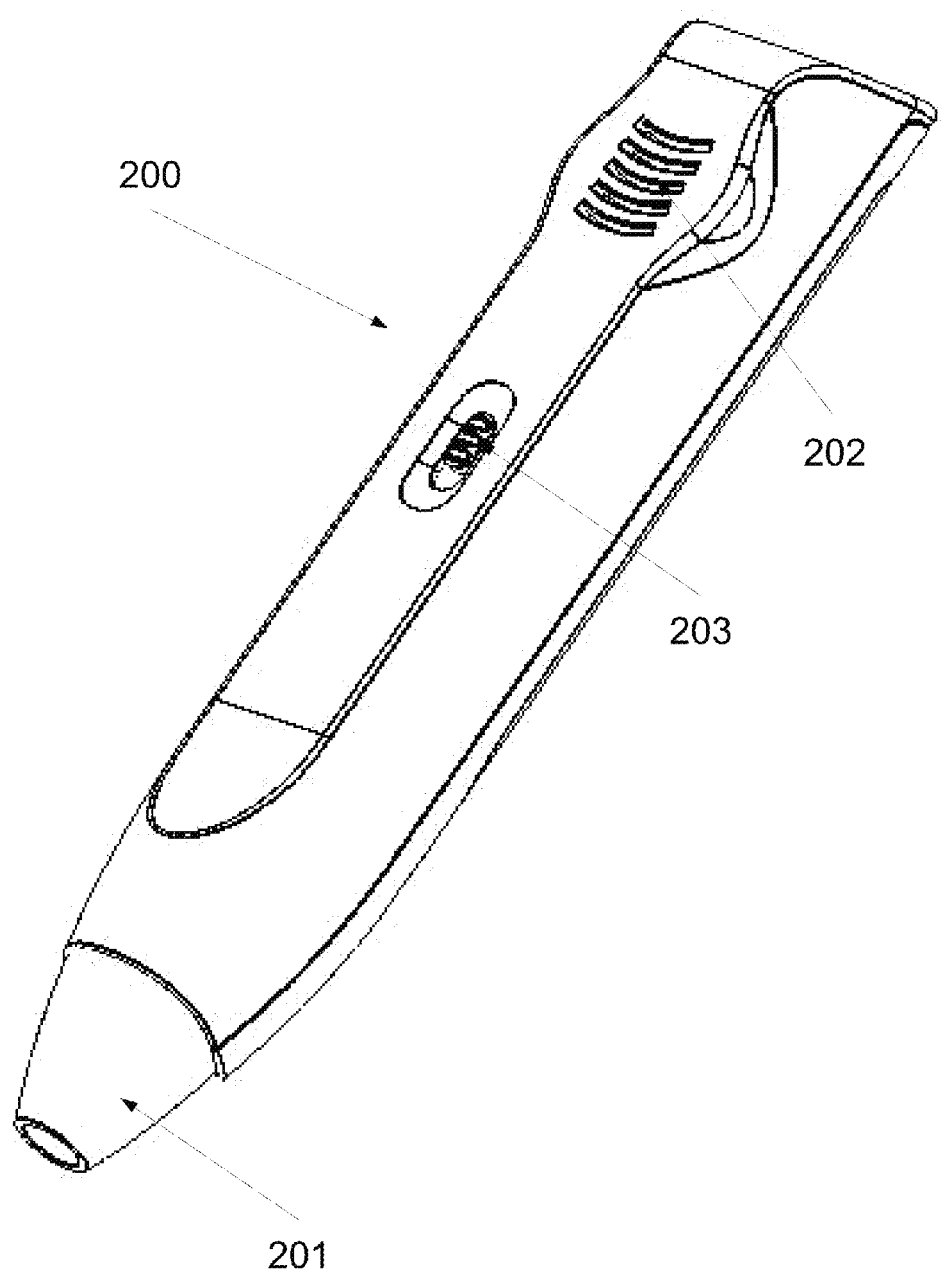
FIG. 6 is a schematic illustration of an external view of a reader device housing that is shaped are a writing implement, according to a preferred embodiment of the present invention.

Preferably, the components of the reader device 1 are mounted in a housing, which is shaped as a writing implement, for example as shown at FIG. 6. In such an embodiment, the reading head is positioned in the end of the housing, as shown at 201, the MMI is positioned in the body of the housing, as shown at 203, and a speaker of the presentation unit is positioned on the other end, for example as shown at 202.

Preferably, the presentation unit 100 comprises a display such as a liquid crystal display (LCD) screen, which is preferably mounted on the housing of the reader device 1. In such an embodiment, the repository comprises video files such as moving picture experts group (MPEG) 1-4 files. The presentation unit 100 displays the matching content record using the LCD screen and plays the audio stream thereof using the speaker. Preferably, the presentation unit 100 comprises one or more vibrating units. In such an embodiment, the repository comprises instructions for the vibrating units. The presentation unit 100 activates the vibrating units according to the matching content record when the related label is identified. The presenting of the content may be understood as playing an audio file, displaying a video file, displaying a text message, activating a vibrating unit, activating a light source or changing the color of light emitted therefrom, etc.

As depicted in FIG. 2, the reader device 1 may comprise a communication interface 101. Such a communication interface allows the reader device 1 to communicate with a computing unit (not shown), such as a laptop or notebook computer, a desktop computer, and a personal digital assistant (PDA). The communication interface 101 may comprise a wired interface, such as a universal serial bus (USB) interface, a FireWire™ interface, or a wireless interface, such as a wireless local area network (WLAN) interface, a radio communication which is based on Bluetooth™ protocol, Wi-Fi™ protocol, a Wi-Max protocol, or industrial, scientific, and medical (ISM) bands, preferably as defined by the ITU-R in 5.138 and 5.150 of the Radio Regulations, which are herein incorporated by reference. The communication between the reader device 1 and the computing unit allows the reader device 1 to download new content records to the repository 7 and to update existing content records. Preferably, the communication allows a user to configure the reader device 1 using a designated application that is hosted on the computer unit. Preferably, as depicted in FIG. 2, the repository 7 is stored on the memory card 103 that is accessed using the card reader 102. The memory card 104 is preferably a solid-state electronic flash memory data storage device, such as a CompactFlash™ card, a SmartMedia™ cards a Memory Stick™ card, a Secure Digital™ card, a MiniSD™ card, or a MicroSD™ card. The card reader 102 may be understood as a CompactFlash™ card drive, a SmartMedia™ card drive, a Memory Stick™ card drive, a Secure Digital™ card drive, a MiniSD™ card drive, and a MicroSD™ card drive.

Preferably, the memory card 103 is a non-replaceable integrated memory card that is integrated into the reader device 1 during the assembly thereof.

Preferably, the sensing unit 2 of the reader device 1 is used for receiving configuration instructions from a computing unit or the user. For example, as further described below, the reader device 1 is configured by using the sensing unit 2 for reading a configuration label that represents a set if instructions. Preferably, the configuration label is displayed on the screen of the computing unit. The configuration label may be used for choosing the working mode of the reader device 1.

Figure 3:
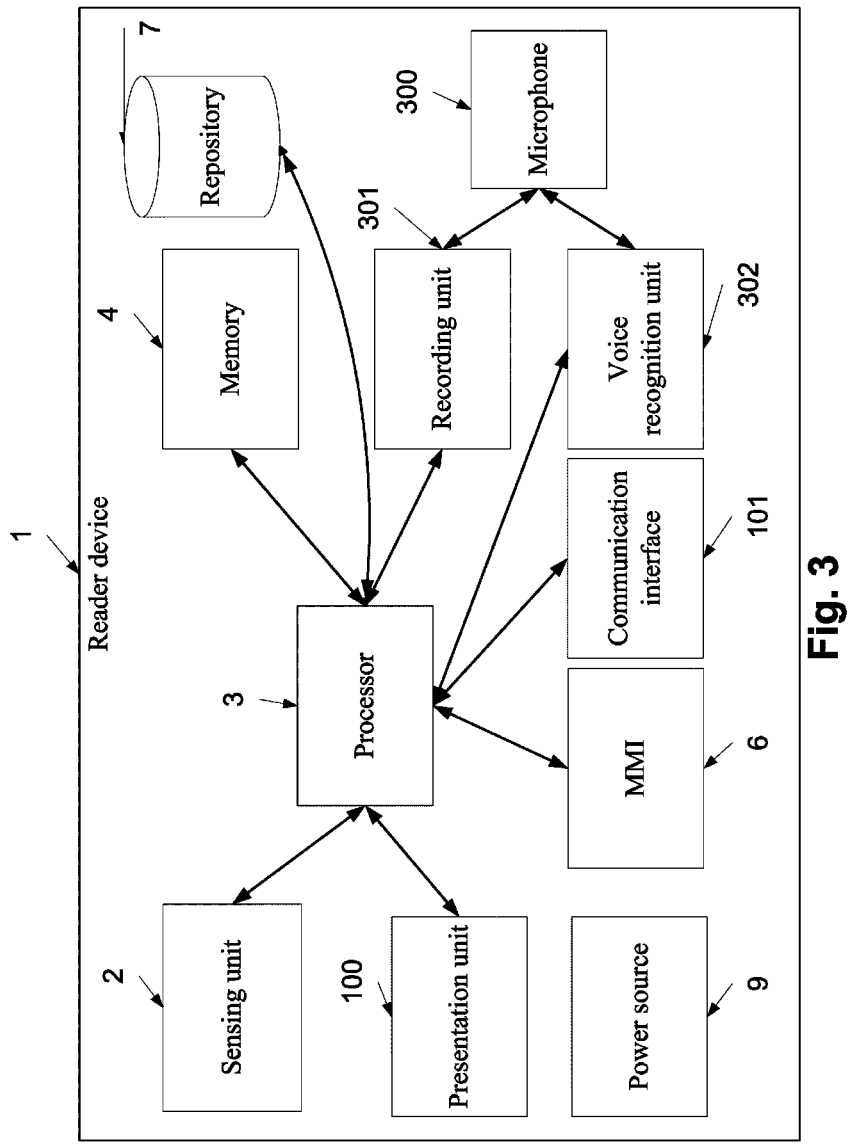
FIG. 3 is a block diagram of a reader device for identifying labels having a voice recognition and recording units, according to a preferred embodiment of present invention.

Reference is now made to FIG. 3, which is another block diagram of the reader device 1, according to one embodiment of the present invention. The reading head 2, the processor 3, the memory 4, the communication unit 101, the MMI unit 6, and the integral battery housing 9 are as in FIG. 2. However, in FIG. 3, the reader device 1 further comprises a microphone 300, a voice recognition unit 302, and a recording unit 301.

The microphone 300 and the recording unit 301 allow the user to record new content records and to associate them with different labels. In such a manner, a user may record accustomed content records and associate them with predefined labels that may be placed beside certain sections in a printed publication. For example, a user may apply an additional interactive layer to family albums, favorite books, adjusted exercises, etc. Preferably, the user records an audio sequence using the microphone and a new label using the reading head 2, as described above. The signature of the new label and the audio sequence are stored in association in the repository 7. Preferably, the recording unit 102 is further connected to an image sensor, such as a complementary metal oxide semiconductor (CMOS) sensor, which is used for recording a video sequence in parallel to the recording of the audio sequence. The video sequence is preferably stored on the same content record. Preferably, the image sensor is the sensor of the reader device 2 that is used for reading labels.

As depicted in FIG. 3, the reader device 1 further comprises a voice recognition unit 302 that is connected to the microphone 300. The voice recognition unit 302 is used for recognizing voice messages stated by the user of the reader device 1. The voice recognition unit 302 generates a control signal to control the operation of the reader device in response to the received voice message.

In one embodiment of the present invention, the reader device 1 allows a user to answer interactively a question or a query in a printed publication. Preferably, a printed publication with a number of questions and associated question labels is provided. Each question label is positioned besides a related question. Preferably, the repository 7 comprises question content records, which are associated with the question labels. Preferably, each question content record stores a recording of a question that is associated with one of the labels in the printed publication. In use, a user makes use of the reader device 1 for reading a question label. Then, the user states a certain voice message and the voice recognition unit 302 of the reader device generates a control signal based thereupon. The processor 3 matches the generated control signal with a set of control signal identifiers, which are stored in association with the related question content record. Each control signal identifier is associated with a response content record that stores a certain response, such as an audio recording of the response that states "wrong" or "correct". The presentation unit 100 presents the response content record that is associated with the matched identifier.

Figure 4:
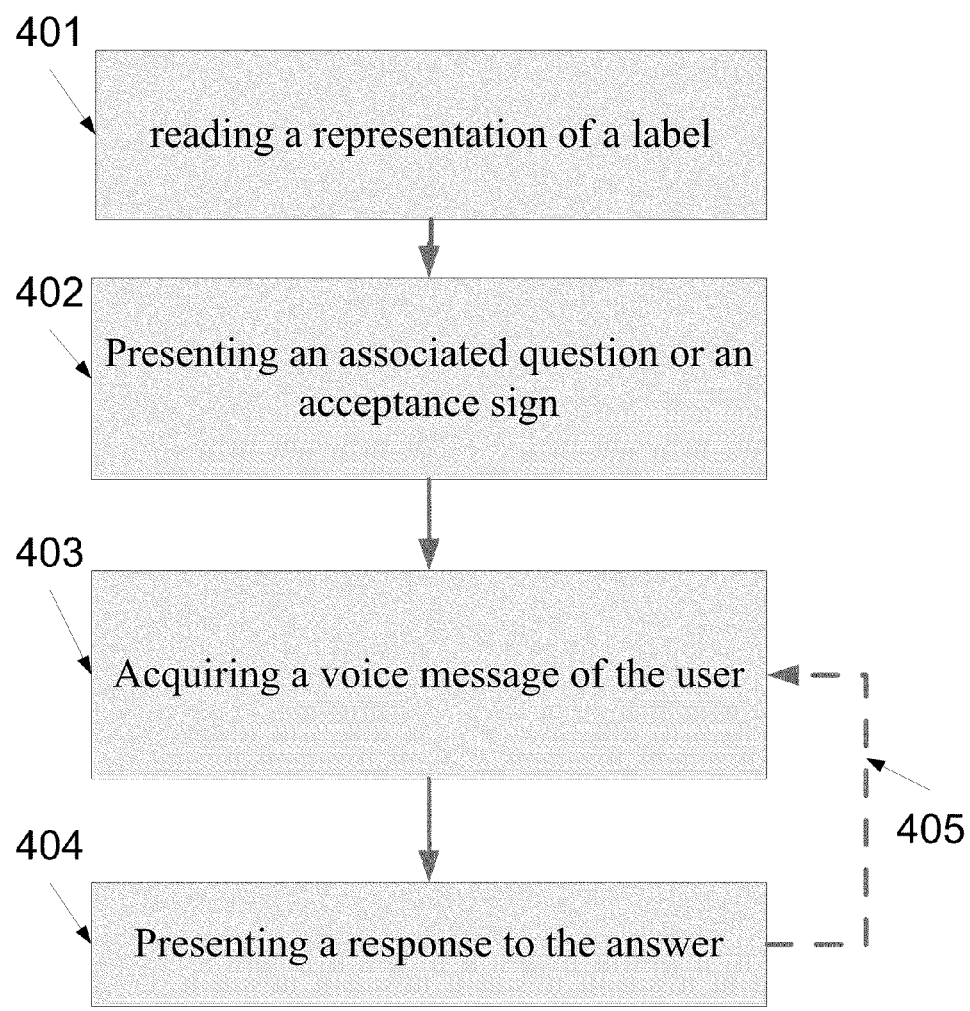
FIG. 4 is a flowchart of a method for using the reader device for allowing a user to participate interactively in a query session, according to a preferred embodiment of present invention.

Preferably, the voice recognition unit 302 comprises a voice biometrics module for effective identification of the human voice according to user's individual voiceprints. Preferably, the received answers or instructions, which are received from the user, are compared with a voice sample, a digital voice model, or a voiceprint, which is stored in the aforementioned repository 7 for verifying identity. Preferably, the stored voiceprint comprises a digital representation of some of the unique characteristics of a user's voice, including physiological characteristics of the nasal passages and vocal chords, as well as the frequency, cadence and duration of the vocal pattern. An automated speech recognition (ASR) module is then used for identifying the user. Preferably, each user is associated with different response content records. In such an embodiment, the reader device may present different content records in response to the same answer. The presented content record is preferably adjusted to the identified user and to his answer. Reference is now made to FIG. 4, which is a flowchart of a method for using the reader device for allowing a user to interactively participate in a communication session, such as a question-answer session or an instruction reception session. During the first step, as shown at 401, the label is read, as described above and matched with a certain content record. Then, as shown at 402, the presentation unit presents the question that is stored in the certain content record to the user or a message that instruct the user to provide operational instructions. Then, as shown at 403, the voice recognition unit acquires the answer to the question or the instructions, which are stated by the user. The acquired answer or instruction is converted to a control signal that is matched with the identifiers, which are associated with the certain content record. Preferably, the content record that is associated with the matching identifier is presented to the user by the presentation unit. In such a manner, the correctness of the answer is presented to the user, as shown at 404. For example, the presentation unit may play an audio file saying "correct", "wrong", or direct the user to the correct answer by playing an audio file that describes or hints at a logical path to the answer. If the user provides the wrong answer or the voice recognition unit does not intercept the user answer, the reader device may repeat steps 403-404, as shown at 405. Preferably, the content record, which is associated with the matching identifier, comprises operational instructions for one or more of the components of the reader device. In such a manner, the user may control the functioning of the components by providing user voice instructions, such as "increase volume" or "record". Preferably, the questions are multiple-choice questions. In such a manner, the label may be associated with a content record with a limited number of identifiers and therefore less memory space is needed and user responses may be identified more easily.

Figure 5:
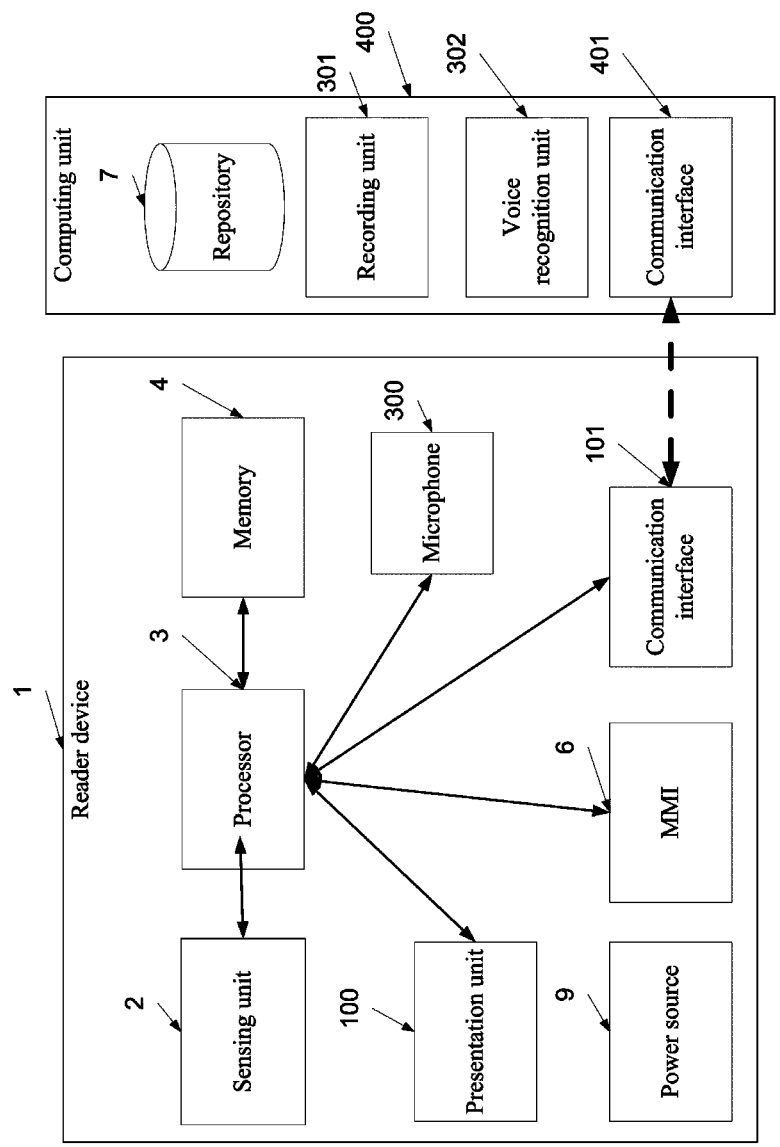
FIG. 5 is a block diagram of the reader device 1 of FIG. 3 and a computing unit that is operatively connected thereto, according to a preferred embodiment of the present invention.

Reference is now made to FIG. 5, which is a block diagram of the reader device 1 of FIG. 3 and a computing unit 400 that is operatively connected thereto. The reading head 2, the processor 3, the memory 4, the communication unit 101, the MMI unit 6, the integral battery housing 9, the microphone 300, the voice recognition unit 302, and the recording unit 301 are as in FIG. 2. However, in FIG. 5 the repository 7, the recording unit, and the voice recognition unit 302 are stored on the computing unit 400. In such an embodiment, the reader device 1 forwards the outputs of the sensing unit 2 and preferably the microphone to the computing unit 400. In such an embodiment, the computing unit 401 performs most of the computational processes. In use, the user directs the reading head 2 of the reader device toward a label that he or she desires to read. The sensor of reading head 2 acquires one or more unique properties of the label and forwards them to the communication interface 101 that forwards them to the communication interface 401 of the computing unit 400. The computing unit 400 matches the unique properties with content records from the repository 7 and identifies a matching content record. The matching content record is transmitted to the reader device 1, via the same interfaces 101 401, that presents it using the presentation unit 100. Preferably, the computing device 400 hosts a designated application that allows the user to change and update the repository 7, to create and associate labels to the content records in the repository 7, to control and configure the voice recognition unit 302 and the recording unit 301, etc.

Reference is now made, once again, to FIG. 3.

In one embodiment of the present invention, the reader device 1 is used as a learning tool. For example, the reader device 1 is used for learning music. In such an embodiment the labels are associated with written music, such as printed notes, chords, pitches or combination thereof and the content records, which are associated with the labels, contain respective audio sequences that provide the user with a real world experience of the written music.

In another preferred embodiment of the present invention, the reader device 1 is used for learning a language. In such an embodiment, each content record may comprise a translation of an associated section, a recording of a word, a recording of a paragraph, or a recording of a phrase in the right pronunciation, etc.

Preferably, the reading head 2 is a color sensor. In such an embodiment, the reader device 1 is preferably used for teaching the names of colors. In use, the user position the reader device 1 in a manner that allows the reading head 2 to intercept light reflected from a certain surface and to analyze the color thereof. The reading head 2 produces a control signal according to the intercepted reflection. The control signal is matched, as described above, with a number of content records, each representing a respective color. Preferably, each content record comprises a recording that verbally describes a certain color.

In one embodiment of the present invention, a number of reading devices may be used simultaneously for providing the user with a richer interactive reading experience of a printed publication. Preferably, two or more different reader devices are designed to read the labels of a certain book. Preferably, each one of the reader device is installed in a housing having a different shape. For example, one reader device is installed in a housing in the shape of Winnie the Pooh™ and the other is installed in a housing in the shape of Tigger Too™. For each one of the reader devices, the same label is associated with a different content record. In such a manner, different reader devices present different content in response to the identification of the same label.

The content which is stored in the device reader with the Winnie the Pooh™ housing is recorded in a certain voice tone and the content, which is stored in the Tigger Too™ reader device with the Tigger Too™ housing is recorded in another voice tone. In such an embodiment, a plurality of reader devices may be used together in a game with a number of participants, such as Monopoly or Clue. In such an embodiment, each one of the reader devices is used as a pawn of a certain participant and the printed publication is a game board. When one of the reader devices reads a certain label, it presents a multimedia content that is designated to the certain participant. In such a manner, the same labels which are presented different multimedia content, which is adapted to different pawns of the game. For example, a reader device, which is shaped as Tigger Too™, will play a growl in response to the reading of a certain label while the reader device, which is shaped as Winnie the Pooh™, will play a recorded human voice.

Preferably, the labels of a certain printed publication are adjusted to different reader devices. A set of labels is adjusted to a reader device X and another set of labels is adjusted to a reader device Y. Preferably, the labels have a shape that hints at which one of the reader devices it is designated.

As depicted in FIG. 2, the reader device 1 comprises a communication interface 101. The communication interface 101 allows the reader device 1 to communicate with one or more other reader devices. Preferably, the communication interface 101 comprises a short-range radio communication interface, an Infrared communication interface, a Bluetooth® communication interface, an Ultrasonic communication interface, sonic communication interface, and the like for establishing communication with the one or more other reader devices.

Preferably, when a sonic or an Ultrasonic communication interface is used, the communication is established by transmitting and receiving voice commands, preferably via a solid interface such as the printed publication itself. In such an embodiment the microphone 300 and the speaker of the presentation unit 100 may be used for establishing the communication. In such a manner the cost of an additional communication interface or the like are saved.

Preferably, each one of the reader devices simulates a certain virtual figure. In such an embodiment, the reader devices are used for simulating an interaction between two or more virtual figures, where each reader device simulates a virtual figure that reacts to the presence of another virtual figure. For example, a first reader device may use its communication interface for detecting the presence of a second reader device.

In such an embodiment, the communication interface of the reader device may comprise a transmitter for allowing sending of messages and presence notifications to the other reader device. When the presence of the second reader device is detected, the first reader device instructs its presentation unit to present a designated content record that simulates a reaction of a figure to the presence of another figure and sends an activation signal that is received at the communication unit of the second reader device. The second reader device reacts to the received activation signal by instructing its presentation unit to present a designated content record that simulates a reaction to the first reader device and preferably sends a response signal to the first reader device. In such a manner, the first and the second reader devices are used for entertaining the user by simulating a conversation or an interaction. Preferably, the communication between the first and the second reader devices is initiated when one of the reader devices identifies a label. In such a manner, the simulated interaction may be described or related to the section of the printed publication that is associated with the label. For example, the two reader devices may be used for presenting a conversation between two or more figures in a book or a playing the same audio file in different voice tones.

Preferably, the sensing unit 2 of the reader device 1 is used for receiving instructions from another reader device 1. For example, in one embodiment of the present invention the sensing unit is designed for reading a label with a unique color or a unique pattern. Such a sensor usually comprises a color sensor or an image sensor for intercepting light reflected from the label and one or more light elements, which are designed for illuminating the label. Preferably, the sensing unit 2 comprises such a sensor and one or more light elements. In such an embodiment, the coupling of two reader devices in a manner that a sensing unit of one of the reader device is directed toward the sensing unit of another allows the establishment of such a communication. The sensing unit 2 allows the reader device 1 to communicate with another reader device using the sensor and the light elements. The reader device 1 transmits instructions by flickering using the light elements and receives instructions, which are coded in flickering of another reader device, using the sensor. In such a manner the cost of an additional communication interface or the like are saved.

In one preferred embodiment of the present invention, the reader device 1 is designed for intercepting light emitted from labels that react to light in a certain waveband. Such labels contain a certain amount of chemical compound, such as Zinc Sulfide and Strontium Oxide Aluminate that causes a photoluminescence excitation, as a reaction to absorption of electromagnetic radiation. In such an embodiment, the reading head 2 emits light that causes a photoluminescence excitation in the label, and a photoelectric sensor intercepts at least a portion of the emission of the photoluminescence excitation. Such a reader device allows the user to read labels with a certain shape, which are not visible to the naked eye until they are illuminated with a light that excites an amount of chemical compound in the label. Such labels may be used, for example, in a printed publication with multi-choice questions. The answers are marked with imperceptible or approximately imperceptible labels that comprise Zinc Sulfide. In use, when the user aims the reader device toward a chosen answer, the reading head 2 illuminates the Zinc Sulfide in the label with blue or ultraviolet light. The Zinc Sulfide exhibits phosphorescence due to the illumination and the photoelectric sensor intercepts the produced light and generates a respective control signal in response. As described above, the respective control signal causes the presentation unit to present a message that indicates whether the correct answer has been chosen or not.

In one preferred embodiment of the present invention, the reader device 1 reads designated configuration labels. In such an embodiment, the reader device 1 reads a label and matches the generated control signal with a number of operation records, where each operation record comprises a representation of a certain configuration label and a set of instructions. When the generated control signal is matched, the set of instructions, which is given in the matched operation record, is performed. For example, the presentation unit 101 is an audio player that is designed for playing the content records in a number of different voice tones. A number of operation records are stored, where each one of the operation records is associated with a different configuration label and contains a set of instructions to activate a different voice tone. The user controls the voice tone being used by allowing the reader device 1 to read the configuration label that is associated with the operation record that contains the instructions to activate the desired voice tone. Other operation records may contain instructions for instructing the reader device to present its memory status or battery status, activating and controlling the recording unit 301, controlling the presentation unit 101, controlling the reading head 2, etc. Preferably, each printed publication contains a page with a number of configuration labels.

Preferably, the reading head 2 is designed for reading configuration labels directly from a screen such as a television screen, a cathode ray tube (CRT) screen, an LCD screen, and a plasma screen. In such an embodiment, the user may attach the reader 1 to the screen of his computing unit in a manner that allows the reading head 2 to read a label that is presented on the screen. Preferably, the reader 1 provides a tool that allows the user to interact with figures, text, and images, which are presented on a screen of a computing device or a television screen. In such an embodiment, a number of configuration labels are presented in a designated website or stored in a media, such as a compact disc (CD), which is distributed with the reader device 1.

It is expected that during the life of this patent many relevant devices and systems will be developed and the scope of the terms herein, particularly of the terms sensor, voice recognition, recording, and presenting are intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A reader device comprising:
   a recording unit configured to record content records, each of said content records selected from the group consisting of: an audio recording, a video recording and an audio and video recording;
   a repository configured to store (a) said content records, and (b) unique codes associated with the content records;
   a sensing unit configured to read printed labels located in or on a printed publication,
   wherein each of said printed labels (a) is associated with a section of the printed publication, (b) encodes one of said unique codes, and (c) is selected from the group consisting of a color label, a monochrome label, a mark, a spot, a label having a unique color combination, and a label having a unique shades of gray color combination;
   a presentation unit configured to play said content records, wherein each of said content records is associated with a specific one of said unique codes; and
   a processing unit configured to (a) identify one of said unique codes when said sensing unit reads one of said printed labels, and (b) instruct said presentation unit to play one of said content records which is associated with the identified one of said unique codes.

2. The reader device of claim 1, further comprising a voice recognition unit configured for intercepting a voice message having a related audio signature associated with one of said content records, wherein said processing unit is further configured for identifying one of said content records according to said related audio signature.

3. The reader device of claim 2, wherein said voice message being a possible answer to a question recorded in one of said content records.

4. The reader device of claim 2, wherein said voice message being instructions to said processing unit, said processing unit further configured for identifying said instructions according to the related audio signature.

5. The reader device of claim 2, wherein each of said content records comprises a respective identifier, said identifying being performed by matching said related audio signature with said respective identifiers, thereby determining one of said plurality of content records.

6. The reader device of claim 2, wherein said voice recognition unit is configured for identifying a user according to a voiceprint in said voice message, said processing unit configured for identifying the second information according to the related audio signature and said user.

7. The reader device of claim 1, further comprising a communication interface for communicating with an additional reader device.

8. The reader device of claim 1, wherein said label is presented on a screen display.

9. The reader device of claim 1, wherein said label is a sticker.

10. The reader device of claim 1, wherein each of said content records comprises a member of the following group: a translation of the section, an answer that matches a question in the section, a description of the section, a description of the label, a description of the color of the section, a description of the color of the label, and an outcome of an exercise in the section.

11. The reader device of claim 1, wherein said sensing unit comprises a light source unit configured for emitting a light beam toward the label, the label comprising photoluminescent components, said light beam causing a photoluminescent excitation of said photoluminescent components, and a photoelectric sensor configured for intercepting at least a portion of the emission of said photoluminescent excitation and thereby reading one or said plurality unique machine-readable representations from the label.

12. The reader device of claim 11, wherein said label is imperceptible when said photoluminescent excitation decreases below a related excitation threshold.

13. The reader device of claim 1, wherein said sensor is usable for at least one member of the group consisting of: receiving configuration instructions for said reader device, communicating with an additional reader device, and choosing a working mode of said reader device.

14. The reader device of claim 13, wherein said member is choosing a working mode of said reader device, said sensor is an image sensor for intercepting light, said image sensor choosing said working mode according to the intensity of said light.

15. The reader device of claim 13, wherein said content record have a respective identifier, said identifying being performed by matching said representation with said respective identifiers, thereby determining which one of said plurality of content records is said first information.

16. The reader device of claim 13 wherein said member is communicating with an additional reader device, said sensor comprises an image sensor for intercepting light, said image sensor being configured for receiving light flickering, said processing unit configured for determining the information according to said light flickering.

17. The reader device of claim 13, wherein said sensor further comprises a light emitting element for transmitting light flickering, said flickering represents instruction for said additional reader device.

18. A system for allowing a user to interactively read a book, said system comprising:
 a plurality of labels configured to be associated with sections of the book, wherein each of said plurality of labels encodes a unique code and is selected from the group consisting of a color label, a monochrome label, a mark, a spot, a label having a unique color combination, and a label having a unique shades of gray color combination;
 a repository having a plurality of content records each associated with a different one of said unique codes, wherein each of said plurality of content records is selected from the group consisting of: an audio recording, a video recording and an audio and video recording; and
 a first reader device configured for reading said respective unique code of each said label and presenting a first content record from said plurality of content records in response.

19. The system of claim 18, further comprising a second reader device configured for reading said respective unique code of each said label and presenting a second content record from said plurality of content records;
 wherein said first and second reader devices are respectively configured for reading a first group and a second group of said labels, said respective unique code of members of said first group being adjusted for said first reader device, said respective unique code of members of said second group being adjusted for said second reader device.

20. The system of claim 18, wherein said first and second content records are different.

21. A method for identifying and presenting information using a label, the label encoding a unique code, the label being associated with a section of a printed publication and is selected from the group consisting of a color label, a monochrome label, a mark, a spot, a label having a unique color combination, and a label having a unique shades of gray color combination, the information being adjusted for the section, said method comprising:
 a) reading the unique code from a label using an image sensor of a reader device;
 b) recording by a user a first content record comprising a voice message from a user using an microphone of said reader device;
 c) associating said content record with said unique code;
 d) rereading said unique code using said image sensor of said reader device;
 e) identifying said content record in response to said rereading; and
 e) presenting said content record to said user using said reader device.

* * * * *